W. S. HARLEY.
SEAT SUPPORT.
APPLICATION FILED NOV. 2, 1911.
1,024,685.
Patented Apr. 30, 1912.
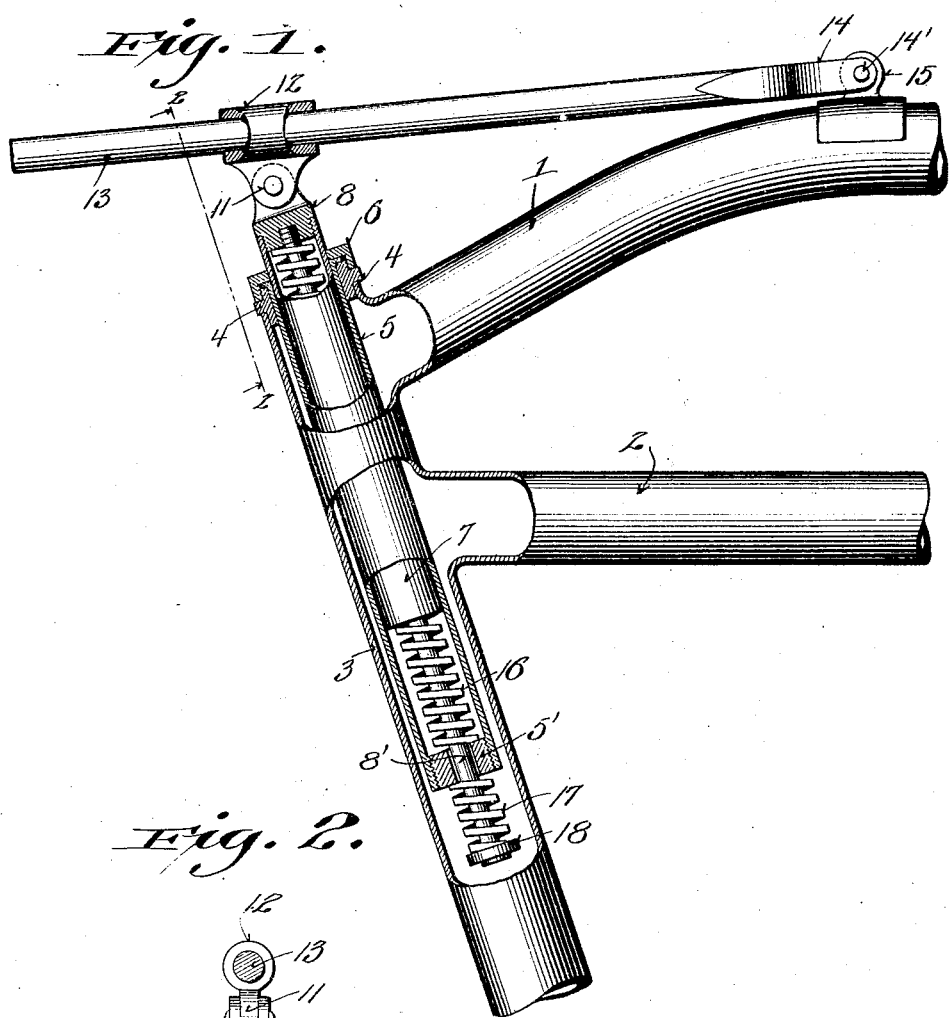
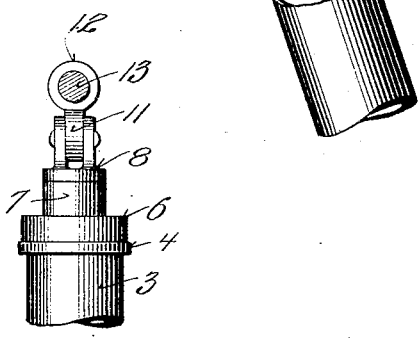

UNITED STATES PATENT OFFICE.

WILLIAM S. HARLEY, OF MILWAUKEE, WISCONSIN.

SEAT-SUPPORT.

1,024,685.  Specification of Letters Patent.  Patented Apr. 30, 1912.

Application filed November 2, 1911. Serial No. 658,263.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Seat-Supports; and I do hereby declare that the following is a full, clear, and exact description thereof.

My invention refers to seat posts for motor vehicles or the like, its object being to provide a simple, economical and effective shackle connection between a spring-controlled seat-post and pivoted seat-bar. The construction and arrangement is such that a bearing sleeve is loosely mounted upon a saddle-bar, the saddle-bar having one end pivoted to the frame of the vehicle. The sleeve is in hinge connection with a head of a spring-controlled seat-post, which seat-post is adapted to rise and fall incidental to travel and owing to the pivoted union between the seat-post and bearing sleeve, the same will automatically adjust itself to the various positions assumed by the saddle-bar, the bar having a slight end-play in said sleeve.

With the above object in view the invention consists in certain peculiarities of construction and combination of parts as hereinafter set forth with reference to the accompanying drawings and subsequently claimed.

In the drawings Figure 1 represents an elevation partly in section of a portion of a motorcycle frame provided with a seat support embodying the features of my invention, and Fig. 2, a detailed cross-section of the saddle-bar and its connections, the section being indicated by line 2—2 of Fig. 1.

Referring by characters to the drawings, 1 represents a horizontal top-bar of a motor-cycle frame, which bar is supported by a second bar 2 arranged parallel therewith, these bars being in brazed connection with a seat-mast 3. The mouth of the seat-mast has brazed thereon a gland 4 into which is fitted a tubular well 5, the same being provided with a flanged end that rests upon the outer end of the gland to which it is clamped by a threaded ring 6. The tubular well 5 constitutes a receiving chamber in connection with the seat-mast for a spring-controlled hollow seat-post 7 that is in telescopic union therewith. The hollow seat-post 7 has secured to its upper end a bifurcated head 8, the same being apertured for the reception of a pivot-pin 10. The pivot-pin 10 is arranged to receive an apertured ear 11 that extends from a bearing-sleeve 12, which bearing-sleeve is provided for sliding engagement with the free end of a saddle-bar 13, the said bar being pivoted at its opposite end by means of branched arms 14 which carry a stud 14' that engages an eared bracket 15, which bracket is brazed or otherwise secured to the frame-bar 1.

The hollow seat-post 7, as shown, has fitted therein a coiled spring 16 that is interposed between the seat-post head and an apertured bottom 5' of the well 5, whereby the seat-post is supported under spring-control in opposition to downward force. The head 8 also carries a plunger-rod 8' which extends downwardly through the coiled spring and is guided at its lower end through its engagement with the apertured bottom 5' of the well, the said rod being extended through the bottom for the reception of a recoiled spring 17 that is fitted over the rod and held in position by a collar 18 secured thereto.

From the foregoing construction it will be readily understood that when the seat-post is reciprocated within the mast, through vibration incidental to load upon the seat-bar, the bearing-sleeve will oscillate about its hinge connection to compensate for variation in the angle assumed by said saddle-bar and, owing to the arc described by said saddle-bar in its vibratory movement about its axis of oscillation it is apparent that said bar will have slight end-play within the bearing-sleeve and thus tendency to cramp the seat-post in its rise and fall will be eliminated. Furthermore the parts being compactly assembled as shown, rigidity in all directions is insured, while at the same time flexibility and yield is permitted freely in a vertical direction.

I claim:

1. In a vehicle frame having a horizontally disposed bar, an oblique seat-mast in union therewith, a spring-controlled seat-post in telescopic union with the seat-mast, and a saddle-bar having one end pivotally secured to said horizontal frame-bar; the combination of a bearing-sleeve in sliding engagement with the free end of the saddle-bar; a head carried by the seat-post, and a pivot connection between the seat-post head and bearing-sleeve.

2. In a vehicle frame having a horizontally disposed bar, an oblique seat-mast in union therewith, a spring-controlled seat-post in telescopic union with the seat-mast, and a saddle-bar having one end pivotally secured to said horizontal frame-bar; the combination of a bearing-sleeve in slidable engagement with the free end of the saddle-bar, an apertured ear extending from the sleeve, an apertured head carried by the seat-post, and a pivot-pin in engagement with the sleeve ear and head apertures whereby said bearing-sleeve is capable of oscillation in one direction incidental to movement of the free end of the saddle-bar.

In testimony that I claim the foregoing I have hereunto set my hand at Milwaukee in the county of Milwaukee and State of Wisconsin in the presence of two witnesses.

WILLIAM S. HARLEY.

Witnesses:
 GEO. W. YOUNG,
 WALTER DAVIDSON.